(12) United States Patent
Heynen et al.

(10) Patent No.: US 12,329,324 B2
(45) Date of Patent: Jun. 17, 2025

(54) FOOD PREPARATION APPLIANCE WITH MULTI-PART ATTACHMENT PART

(71) Applicant: VORWERK & CO. INTERHOLDING GMBH, Wuppertal (DE)

(72) Inventors: Andreas Heynen, Radevormwald (DE); Kai Landsecker, Düsseldorf (DE); Frank Starflinger, Saratoga, CA (US); Philipp Charopoulos, Ratingen (DE); Sigurd Wojke, Sprockhövel (DE)

(73) Assignee: VORWERK & CO. INTERHOLDING GMBH (DE)

( * ) Notice: Subject to any disclaimer, the term of this patent is extended or adjusted under 35 U.S.C. 154(b) by 357 days.

(21) Appl. No.: 17/847,844

(22) Filed: Jun. 23, 2022

(65) Prior Publication Data
US 2023/0018278 A1    Jan. 19, 2023

(30) Foreign Application Priority Data

Jul. 14, 2021   (EP) .................................... 21185470

(51) Int. Cl.
*A47J 43/07*      (2006.01)
*A47J 43/046*     (2006.01)
*A47J 43/06*      (2006.01)

(52) U.S. Cl.
CPC ......... *A47J 43/0777* (2013.01); *A47J 43/046* (2013.01); *A47J 43/06* (2013.01); *A47J 43/0722* (2013.01)

(58) Field of Classification Search
CPC .... A47J 43/046; A47J 43/075; A47J 43/0772; A47J 43/0777; A47J 43/0783; A47J 43/0788; A47J 43/0794

USPC ......................................................... 241/37.5
See application file for complete search history.

(56) References Cited

U.S. PATENT DOCUMENTS

| 4,194,697 | A | * | 3/1980 | Lembeck | A47J 43/0777 |
| | | | | | 366/314 |
| 4,523,720 | A | * | 6/1985 | Behringer | A47J 43/046 |
| | | | | | 241/37.5 |
| 5,921,485 | A | * | 7/1999 | Plavcan | A47J 43/07 |
| | | | | | 241/282.2 |
| 2005/0000370 | A1 | * | 1/2005 | Kernan | F16P 3/08 |
| | | | | | 99/492 |

(Continued)

FOREIGN PATENT DOCUMENTS

| DE | 102014111193 A1 | 2/2016 | |
| GB | 2547683 A | * 8/2017 | ............. A47J 27/004 |

(Continued)

OTHER PUBLICATIONS

Search Report for Application No. EP21185470.8 dated Jan. 7, 2022 (2 pages).

*Primary Examiner* — Bobby Yeonjin Kim
*Assistant Examiner* — P Derek Pressley
(74) *Attorney, Agent, or Firm* — Barnes & Thornburg LLP

(57) ABSTRACT

A food preparation appliance includes a food preparation vessel, a lid, an attachment part, a locking device, and a plurality of sensors. The lid may be placed on the food preparation vessel. The attachment part may be placed on the food preparation vessel instead of the lid. The locking device is for locking the lid placed on the food preparation vessel and for locking the attachment part placed on the food preparation vessel.

15 Claims, 8 Drawing Sheets

(56) References Cited

U.S. PATENT DOCUMENTS

| | | |
|---|---|---|
| 2005/0185509 A1 | 8/2005 | Carnevale |
| 2012/0085851 A1 | 4/2012 | Allen |
| 2015/0208868 A1* | 7/2015 | Caldewey ............ B01F 35/212 366/243 |
| 2019/0003869 A1* | 1/2019 | Hackert ................ A47J 36/321 |

FOREIGN PATENT DOCUMENTS

| | | | | |
|---|---|---|---|---|
| GB | 2591228 A | * | 7/2021 | ............ A47J 19/023 |
| WO | WO-2021140333 A1 | * | 7/2021 | ............ A47J 19/023 |

\* cited by examiner

FOOD PREPARATION APPLIANCE WITH MULTI-PART ATTACHMENT PART

CROSS-REFERENCE TO RELATED APPLICATION

This application claims the benefit of European Patent Application No. 21185470.8, filed on Jul. 14, 2021, the disclosure of which is hereby incorporated in its entirety by reference herein.

TECHNICAL FIELD

The present disclosure relates to a food preparation appliance for preparing a food.

BACKGROUND

The food preparation appliance comprises a food preparation vessel in which the food can be prepared. The food preparation appliance comprises a lid for the food preparation vessel. The food preparation appliance comprises a locking device for locking the lid when the lid is placed on the food preparation vessel. The food preparation appliance comprises a sensor which is triggered when the locking device locks the placed lid.

SUMMARY

The food preparation appliance comprises a multi-part attachment part (add-on part). The present disclosure further relates to a multi-part attachment part for the food preparation vessel and a method.

Electrically operated food preparation appliances with a food preparation vessel and a lid for the food preparation vessel are known from the publications DE 10 2014 111 193 A1 and DE 10 2017 121 946 A1. The lid placed on the food preparation vessel can be locked with an electrically operated locking device. Once the lid is locked, it can no longer be released from the food preparation vessel. To release it, the locking device must first be unlocked.

By means of a sensor, it can be checked in such a food preparation appliance whether the lid is placed on the food preparation vessel and properly locked. Depending on this, the further operation of the food preparation appliance can be controlled. Food preparation appliances with sensors for checking the locking of a placed lid are marketed under the Thermomix® brand by Vorwerk Deutschland Stiftung & Co. KG, Wuppertal, Germany.

For the Thermomix® food processor, there are attachment parts such as the Varoma® attachment part, which consists of several parts and is provided for steam cooking. The multi-part attachment part Varoma® comprises a container-like base body with a steam-permeable bottom and a lid for the base body. The attachment part Varoma® is placed on the locked lid of the Thermomix® food processor for steam cooking. However, it is then not possible to check whether the parts of the attachment part Varoma® have been assembled by a user and the attachment part has been placed on the food preparation vessel in such a way that a food can be prepared by steam cooking as planned.

DETAILED DESCRIPTION

FIGS. 1 to 5 show a schematic representation of all five parts of a chopping cap (chopping attachment). The chopping cap is an attachment part for a food preparation appliance, namely for a food processor.

Figure 1:
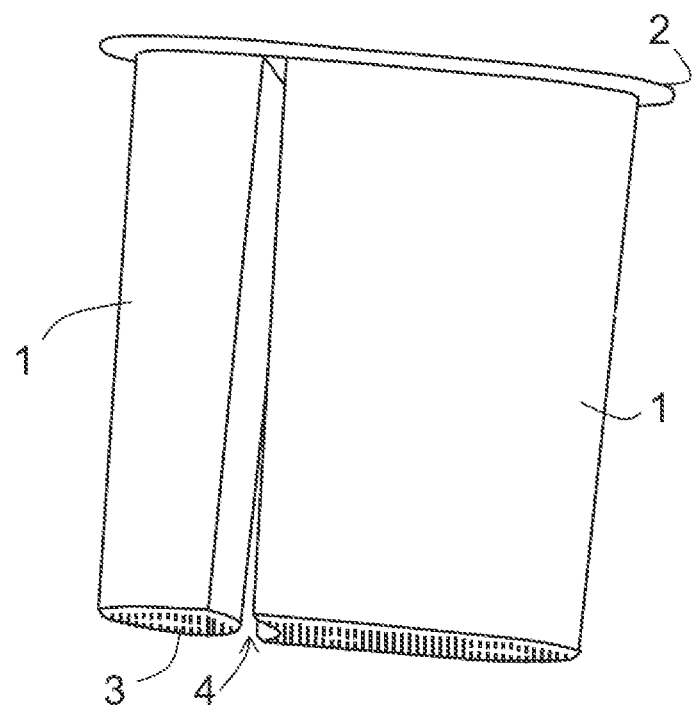
FIG. 1 illustrates a pressing means with plungers of a chopping cap.

FIG. 1 shows a pressing means with two plungers 1. The two plungers 1 are firmly connected to each other on their upper side by a circumferential edge 2. The edge 2 protrudes laterally. Each plunger 1 can also be designed as a vessel, for example as a measuring cup. On the underside, both plungers 1 may have protruding knobs 3 which are intended to fix an ingredient of a food or a food. There may be a gap 4 between the two plungers 1 as shown in FIG. 1.

Figure 2:
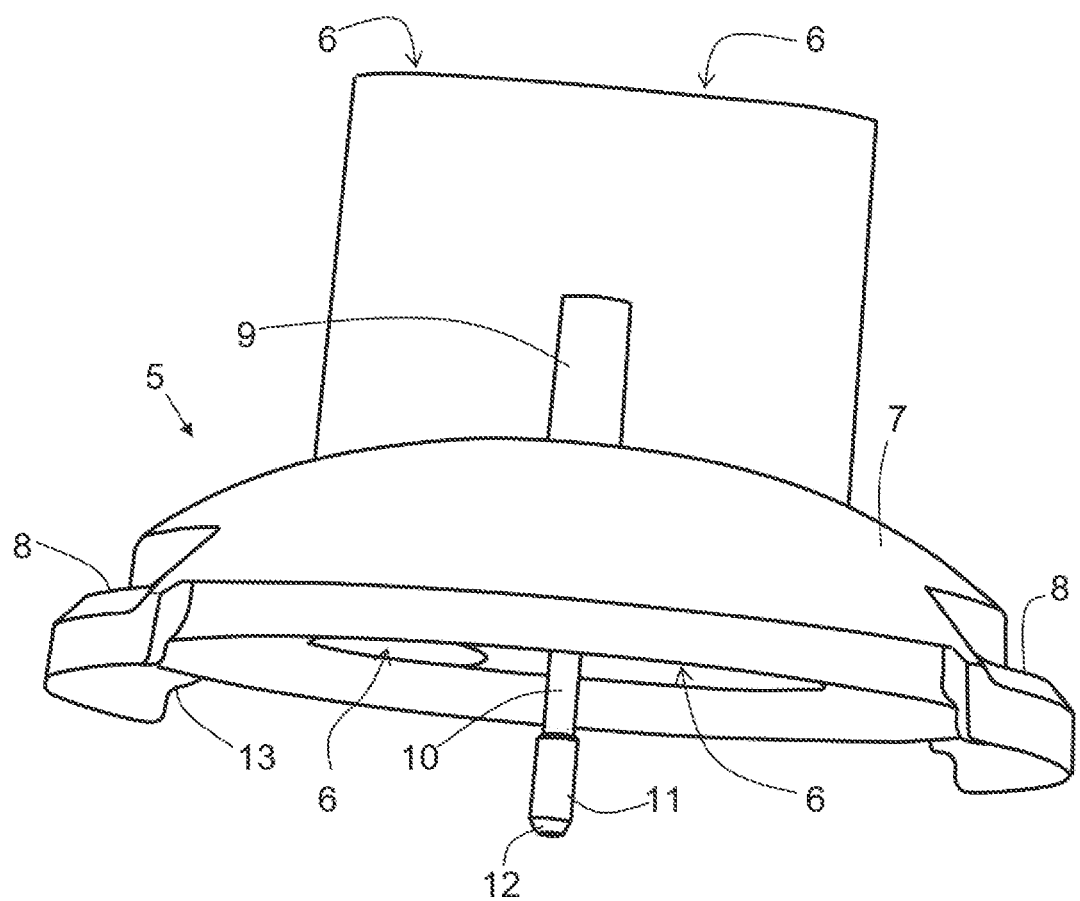
FIG. 2 illustrates cover of the chopping cap.

In FIG. 2, a cover 5 of the chopping cap is shown. The cover 5 comprises two chutes 6, which are formed by an upwardly projecting neck with an inner partition. The chutes 6 are adapted to the two plungers 1 in such a way that the plungers 1 can be inserted into the two chutes 6. The laterally projecting edge 2 prevents the plungers 1 from falling through the chutes 6. By means of the plungers 1, a food or an ingredient of a food can be pressed through the chutes 6 against a chopping tool 14 shown in FIG. 3.

The chutes 6 and the neck are connected on their lower side to a curved cap 7 in an edge region of the cap 7. On the lower side of the cap 7, part-circular steps 8 are provided on two opposite sides. The two part-circular steps 8 project laterally and downwardly from the cap 7.

A mandrel 9 projects upwardly from the cap 7 from approximately the center of the cap 7. The mandrel 9 retains a rod 10 projecting downwardly relative to the cap 7. The outer diameter of the mandrel 9 is larger than the maximum outer diameter of the rod 10 for stability reasons. The rod 10 may have a cylindrical widening 11 at its free end with a tapering free end 12. The underside of the steps 8 may be designed as a hook shape 13.

Figure 3:
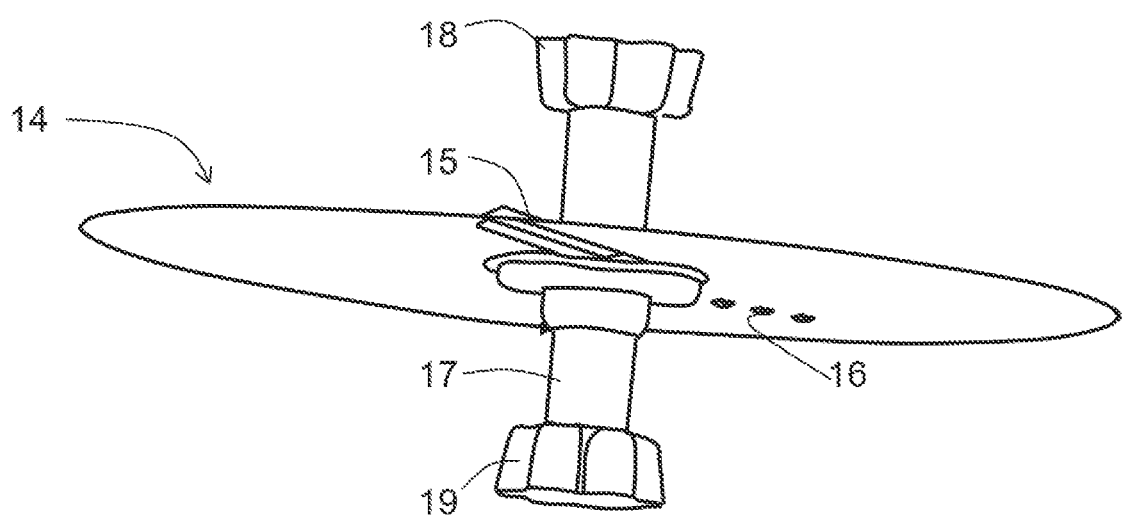
FIG. 3 illustrates a cutting disc of the chopping cap.

In FIG. 3 a chopping tool is shown, namely a cutting disc 14 with a knife or blade 15 and further cutting means 16. By means of the knife 15 and the further cutting means 16, the ingredient of a food or a food can be chopped by rotating the cutting disc 14 around its shaft 17. By chopping, a chopped ingredient passes through the cutting disc 14. The shaft 17 is shaft-shaped, at least partially hollow and has wreath-shaped coupling elements 18 and 19 at its ends. The rod 10 can be inserted through the upper coupling element 18 into the shaft of the shaft 17. This stabilizes the position of the shaft 17 during operation in the assembled state of the chopping cap.

Figure 4:
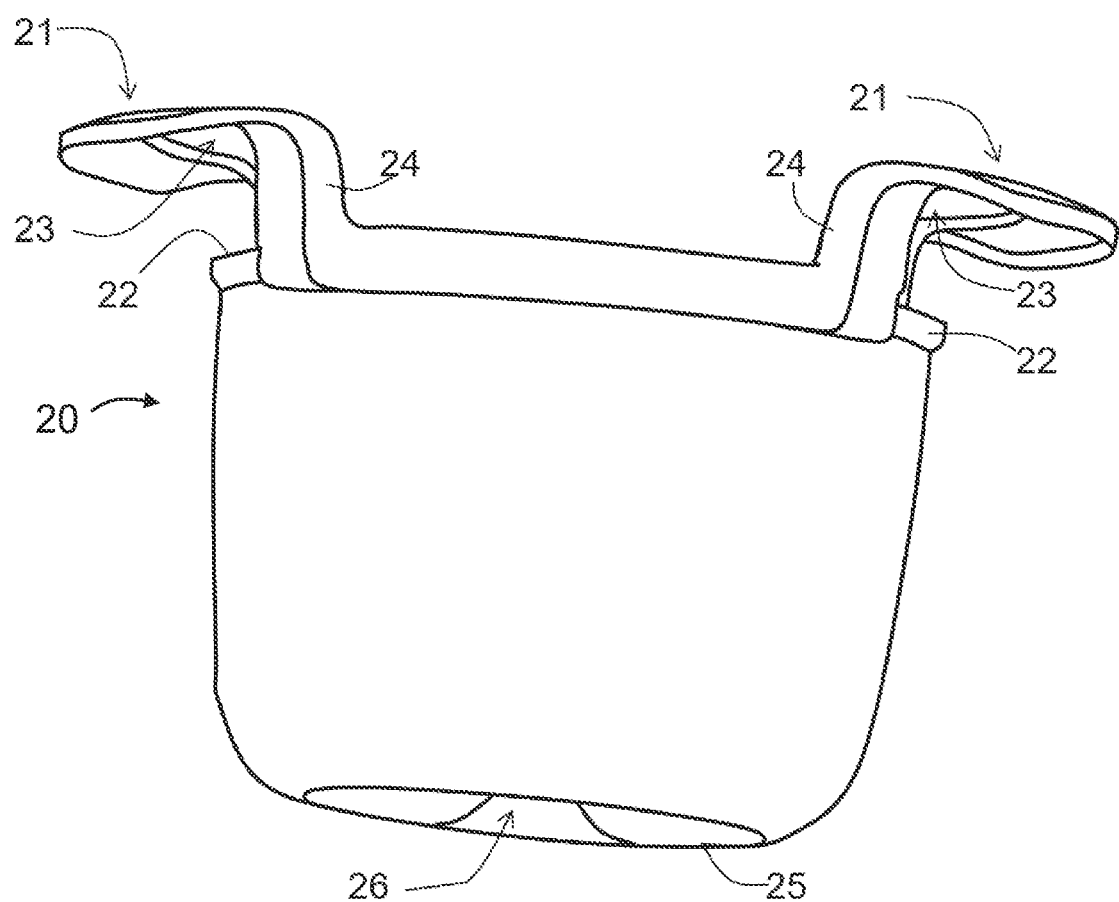
FIG. 4 illustrates a container of the chopping cap.
Figure 8:
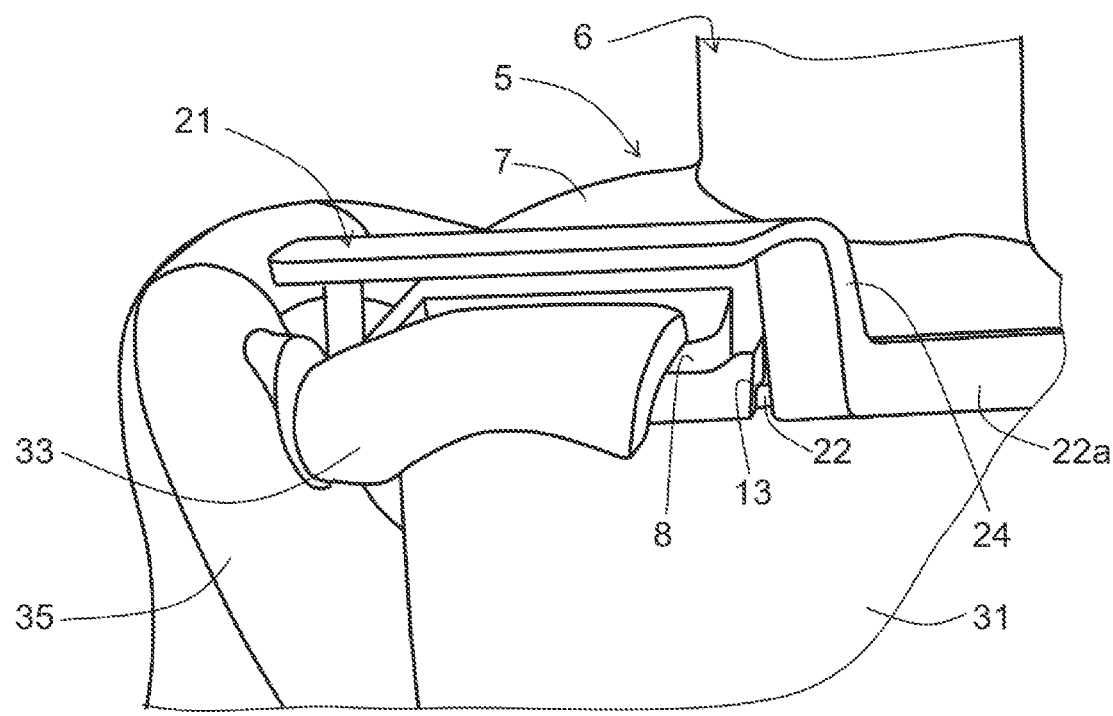
FIG. 8 illustrates a food processor with chopping cap.

FIG. 4 shows a container 20 of the chopping cap. On the upper side of the container 20 there are two opposite handles 21. The two handles 21 extend from upper edge sections 22 of the container 20 first upwards and then outwards to the side. Each handle 21 thus forms an opening 23. The steps 8 can be inserted into the openings 23. The undersides of the steps 8 then sit on the edge sections 22. The upwardly facing ridges 24 of the handles 21 then prevent lateral slippage of the cover 5 with the cap 7 and contribute to position the cover 5. The hook shapes 13 of the undersides can then engage around the edge sections 22 and thus make a complementary contribution to positioning the cover 5 relative to the container 20 and preventing lateral slippage (see also FIG. 8).

The bottom 25 of the container 20 has a funnel-shaped opening 26 that opens into a hollow shaft.

Figure 5:
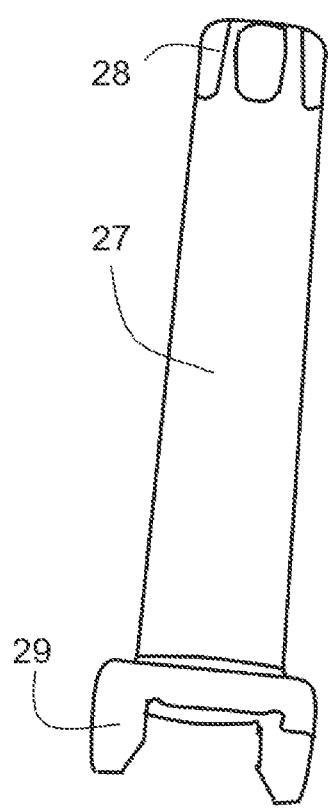
FIG. 5 illustrates a shaft of the chopping cap.

In FIG. 5, a shaft 27 is shown which can be inserted through the funnel-shaped opening 26 and the adjoining hollow shaft. The upper end of the shaft 27 has a coupling element 28 which can be inserted into the lower coupling element 19 of the cutting disc 13. The outer contour of the coupling element 28 corresponds to the inner contour of the coupling element 19. This ensures that the two coupling elements are connected to each other in a rotationally fixed manner when the coupling element 28 is inserted into the coupling element 19.

The shaft 27 has a lower coupling element 29. The lower coupling element 29 can be placed on a mixing tool inside a food preparation vessel of a food processor such that the coupling element 29 is connected to the mixing tool in a rotationally fixed manner. Rotation of the mixing tool then results in the cutting disc 13 also being rotated when the shaft 27 is connected to the cutting disc 13 in a rotationally fixed manner.

Figure 6:
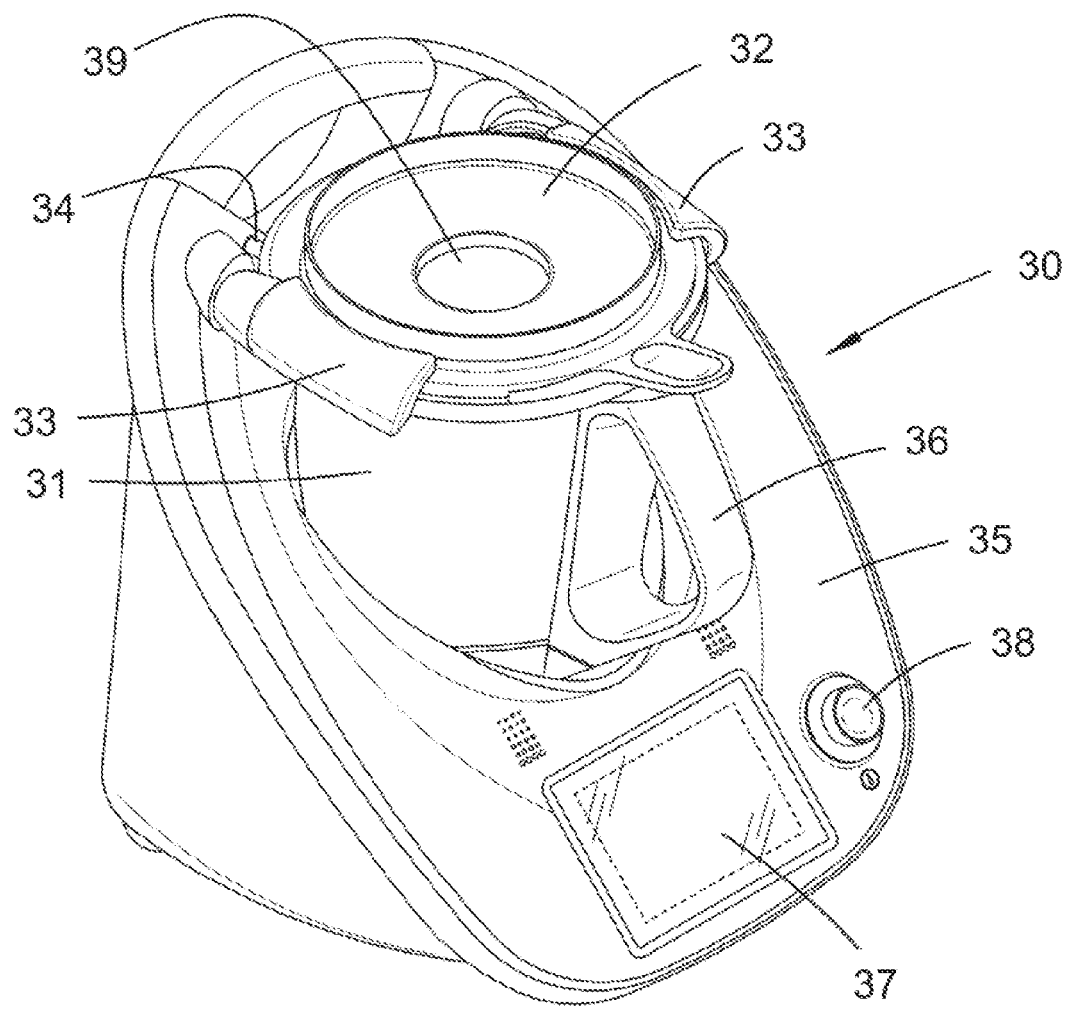
FIG. 6 illustrates a food processor with lid part.

FIG. 6 shows such a food processor 30 with a food preparation vessel 31. A lid part 32 is placed on the food preparation vessel 31. The lid part 32 for the food preparation vessel 31 is locked by arm-like locking elements, i.e. arms 33. The lid part 32 is located between the two arms 33. The arms 33 can be rotated about their longitudinal axis in a motorized manner to reciprocate between an open position and a locking position. The lid part 32 has pushed down and thus triggered a sensor, namely a rocker arm 34 of an electrical switch. The arm-like locking elements 33 and the rocker arm 34 are attached to a base part 35 of the food processor 30. The food preparation vessel 31 is inserted into the base part 35 and can be removed from the base part 35. In order to be able to remove the food preparation vessel 31, this comprises a handle 36. The base part 35 comprises a display 37 and a rotary switch 38 for operation. The lid part 32 comprises an opening 39 in the center, which can be closed with a vessel-like closure. Due to the triggered rocker arm 34, the control unit of the food processor 30 has received information that the lid part is properly placed and locked. However, the control unit of the food processor 30 has not been able to obtain information about the state of the vessel-like closure which is not shown.

When the arm-type locking elements 33 are rotated to their open position, this moves the rocker arm 34 upward by spring force to its non-triggered position. This movement of the rocker arm 34 lifts the lid part 32 accordingly. The lid part 32 is then placed on the rocker arm 34, but not locked.

Figure 7:
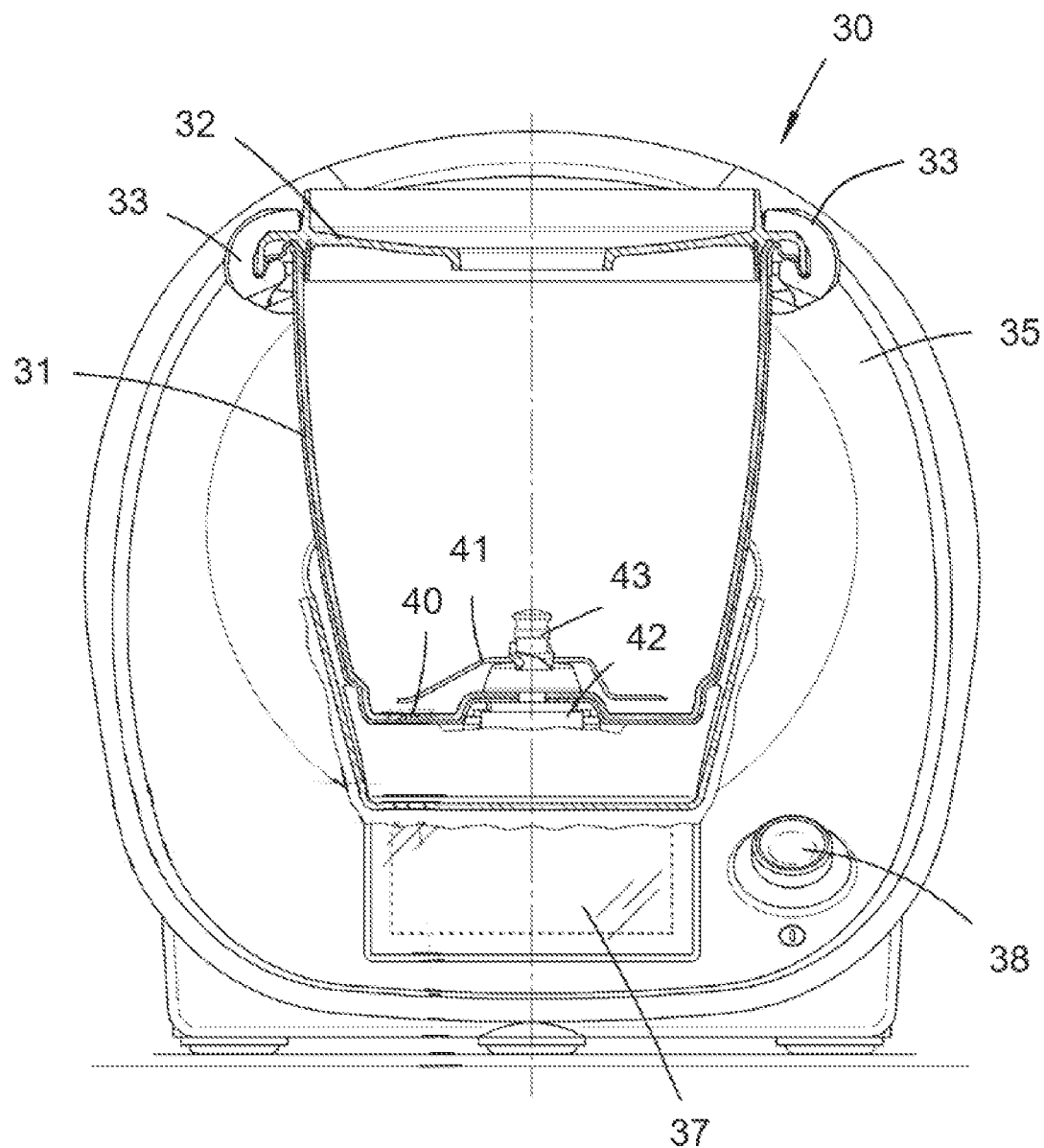
FIG. 7 illustrates a food processor with inside view into the food preparation vessel.

FIG. 7 shows the food processor 30 of FIG. 6. The region of the food preparation vessel 31 is shown cut open to reveal the interior. A rotatable mixing tool 41 is located at the base 40 of the food preparation vessel 31. The mixing tool 41 is driven by a shaft 43, which extends through the base 40 of the food preparation vessel 31. The shaft 43 is inserted with a lower coupling element into a coupling element 42 of the base part 35 and is thereby connected in a rotationally fixed manner. The coupling element 42 is connected to the shaft of an electric motor located in the base part 35. The mixing tool 41 can be rotated via the electric motor in the base part 35.

When the locking element 33 shown in the upper left of FIG. 7 is rotated counterclockwise and the locking element 33 shown in the upper right is rotated clockwise, the lock is released and the lid part 32 can be removed from the food preparation vessel 31.

The coupling element 29 shown in FIG. 5 can be placed on the shaft 43 such that a rotationally fixed connection is established between the mixing tool 41 and the coupling element 29.

Instead of the lid part 32, the chopping cap can be placed on the food preparation vessel 31. This is shown partially in FIG. 8 in the locked position. The locking element 33 rests on the step 8 of the cover 5 in such a way that the cover 5 can no longer be released from the food preparation vessel 31 as a result. The cover 5 rests on the upper edge 22 of the vessel with the handle 21. As a result, the vessel with the handle 21 cannot be removed from the food preparation vessel 31. The rocker arm 34 is operated by a laterally projecting edge section 22a of the vessel with the handle 21.

It is true that the cover 5 can also be locked without the presence of the vessel that comprises the handle 21. In this case, however, the rocker arm 34 is not operated and thus not triggered. The control device of the food processor is indeed configured such that it then recognizes the locked state. At the same time, the control device has the information that the rocker arm 34 has not been triggered due to the absence of the vessel with the handle 21. The control device therefore detects a faulty state.

The detection of the locked state by the locking elements 33 may be done via a pressure sensor or, for example, via an evaluation of a current consumption of the electric motor used for locking, which has to apply an increased force when locking takes place.

The example has shown that at least two parts of a multi-part attachment part can be monitored with little effort.

It is a task of the device of the present disclosure to be able to reliably use a multi-part attachment part in a food processor.

The task of the device of the present disclosure is solved by a food processor with the features of the first claim. The additional claim relates to an attachment part for a food processor. A further additional claim relates to a method. Advantageous embodiments result from the dependent claims.

A food preparation appliance according to the present disclosure comprises a food preparation vessel and a lid that can be placed on the food preparation vessel. The food preparation appliance has an attachment part that can be placed on the food preparation vessel instead of the lid. The attachment part comprises two parts, i.e. a first part and a second part. The food preparation appliance comprises a locking device for locking the lid placed on the food preparation vessel and for locking the attachment part placed on the food preparation vessel. The food preparation appliance comprises a sensor that is triggered when the placed lid is locked by the locking device or by the placed attachment part. The sensor is not triggered when only a part of the attachment part is placed on the food preparation vessel and locked.

A food preparation appliance according to the present disclosure is an electrical appliance, i.e., an appliance that requires electrical power to operate. A food preparation appliance according to the present disclosure is an appliance with which at least one step of a food preparation can be performed, such as mixing, chopping, moistening, drying, cooling or heating. Thus, by the food preparation appliance, a food or at least one ingredient of a food can be mixed, chopped, moistened, dried, cooled, and/or heated, for example. A food may be solid and/or liquid. A food may comprise only one food product such as only potatoes. A food may be composed of various ingredients such as carrots, peas, onions, salt and pepper. A food may comprise a liquid such as water or oil.

The food preparation vessel is provided for preparing a food. Ingredients of a food that are placed directly in the food preparation vessel may be chopped, for example, by a rotatable mixing tool. The food preparation vessel may comprise heating elements for heating ingredients of a food or a food in the food preparation vessel. However, the food preparation appliance may also comprise heating elements for heating the food preparation vessel, which are provided separately from the food preparation vessel. A base part of the food preparation appliance may comprise a recess that may define a position of the food preparation vessel. The recess may be a vessel-like depression into which the food preparation vessel may be inserted or is inserted. The recess may comprise a drain opening that prevents liquid from accumulating in the recess. In particular, the food preparation vessel may be removed from the cutout and thus separated from the base part of the food preparation appliance.

The food preparation vessel comprises an opening. The lid can be placed on the food preparation vessel in such a way that the opening is then covered by the lid.

The attachment part differs from the lid in its function. The function of the lid consists in being able to close the food preparation vessel completely or at least largely completely. The attachment part may contribute to the preparation of a food in other ways. For example, the attachment part may chop a food or an ingredient of a food. Since the lid cannot chop, the function of the lid is different from the function of the attachment part.

It is not excluded that the attachment part can also close the food preparation vessel completely or at least almost completely. However, an attachment part in the sense of the present disclosure must be able to perform at least one function beyond this.

The attachment part comprises a first part and a second part if the two parts can be non-destructively released from each other and reassembled. No tool is required for detaching.

It is possible that the two parts can be assembled in such a way that they are subsequently connected to each other, for example by a snap-in connection. In order to then release the two parts from each other again, the snap-in connection must first be released. If the snap-in connection is released, the two parts are not assembled within the meaning of the present disclosure. Such a snap-in connection may comprise, for example, a latch that can be moved to a locked position and to an unlocked position. In the locked position, the latch may then be engaged so that the latch cannot move away from the locked position in an unplanned manner.

It is possible that the two parts can only be loosely assembled. An example of loose assembling is when the one first part can be inserted into a recess provided for this in the second part. If the first part is inserted into the recess of the second part provided for this, the two parts are then assembled in the sense of the present disclosure. The two parts are then only loosely assembled in the sense of the present disclosure, because lifting the first part is sufficient to release it from the second part. Thus, in the case of loose assembling, there is no connecting means which provides a fixed mechanical connection between the two parts and which must first be released in order to be able to separate the two parts from each other.

The attachment part may comprise more than two parts that can be assembled to form the attachment part and released from each other without a tool.

The locking device may lock the lid when the lid is placed on the food preparation vessel. If the lid is locked, the lid can no longer be released from the food preparation vessel. If the lid is to be released from the food preparation vessel, the locking device must first be unlocked.

If the attachment part has been placed on the food preparation vessel instead of the lid, the locking device can lock the attachment part. To release the attachment part from the food preparation vessel, it is then also necessary to unlock the locking device first. This applies to at least two parts of the attachment part. If the attachment part comprises more than two parts, it is not necessary that no part of the attachment part can be released when the locking device locks the attachment part. For example, the attachment part may comprise four parts. If the attachment part is locked, for example, three parts cannot be released, but the fourth part can. However, it is also possible that the attachment part is such that all four parts cannot be released when the attachment part has been locked by the locking device. For example, it may be that the attachment part comprises five parts. If the attachment part is locked, for example, four parts cannot be released, but the fifth part can.

A base part of the food preparation appliance may comprise the locking device, which may non-detachably connect the lid to the food preparation vessel in the locked state. If the food preparation appliance is such that the food preparation vessel can be released from the base part, the placing of the lid or the placing of the attachment part on the food preparation vessel according to the present disclosure comprises that the food preparation vessel is not released from the base part. The food preparation vessel is then inserted into a recess of the base part, for example. The base part may comprise a control device, an electric drive, a sensor, a switch and/or a display.

The sensor may be in a triggered state and in a non-triggered state and signal which state it is in. The sensor may therefore assume two different states. The signaling of the state may be done by an electrical signal. Through the sensor, the food preparation appliance verifies the locked and unlocked state because the sensor is triggered when the placed lid or the placed attachment part is locked by the locking device. Alternatively or additionally, the food preparation appliance can indicate the locked or unlocked state. The sensor is not triggered if only a part of the attachment part is placed on the food preparation vessel and locked. This part can be the first part or the second part. The sensor is not triggered if no placed attachment part and no placed lid is locked. If an attachment part or a lid is only placed on the food preparation vessel but not locked, the sensor is not triggered. The sensor is therefore triggered by the locking. It is then in the triggered state. Unlocking brings the sensor to the non-triggered state. Following unlocking, the sensor is therefore in the non-triggered state.

Since the attachment part comprises two parts, it is possible for a user to inadvertently place only one part of the attachment part on the food preparation vessel. It is possible, for example, that the user subsequently operates the food preparation vessel in such a way that the placed part is locked, so that it can no longer be released from the food preparation vessel. Because the sensor is not triggered following the locking of only one part of the attachment part, a malfunction can be detected by the food preparation appliance. The presence of a malfunction can then be indicated to the user, for example. This allows the user to promptly determine that a part of the attachment part is missing. The user can then timely rectify the fault. Trouble-free operation can thus be ensured in an improved manner. It is also possible that the food preparation vessel does not allow further processing steps until the fault has been rectified. Also in this way problems can be avoided that may be associated with the malfunction.

In one embodiment, the locking device is such that the attachment part in the placed state is moved from an initial position to an end position by the locking. Moving the attachment part to the end position triggers the sensor. In the end position, the attachment part is locked. The sensor is therefore triggered when the attachment part is in the end position.

It is possible, for example, that the attachment part is placed and then rotated to reach the end position and thus the locked position. The rotation of the attachment part can be performed manually by the user, for example. However, the rotation can also be performed motorized.

In the placed state, for example, an elastically deformable sealing ring or a differently shaped elastic seal of the attachment part may rest on the food preparation vessel. The attachment part may then be moved further in the direction of the food preparation vessel, for example by the locking device, because the elastically deformable sealing ring or the differently shaped elastic seal can be compressed. The presence of a deformable sealing ring or differently shaped elastic seal thus allows the placed attachment part to be moved linearly from its then initial position to its end position following placement. When unlocked, the elastically deformable sealing ring or the differently shaped elastic seal causes the attachment part to move back to its initial position. The movement can again be effected manually by the user. In this embodiment, however, it is possible in a particularly simple manner that the movement in the direction of the end position is performed in a motorized manner.

It is possible that the attachment part is also placed on a resilient component of a mechanical switch by placing it on the food preparation vessel. The mechanical switch can be arranged such that a clearance remains between the attachment part and the food preparation vessel, at least in the vicinity of the mechanical switch. For example by a tilting movement, the attachment part can then be pivoted further towards the end position, for example by the locking device. The mechanical switch, namely its resilient component, is thereby operated and the switch is thereby triggered. The movement into the end position can again be motorized in a technically simple manner. The movement of the attachment part back into its initial position may be effected by the resilient force of the resilient component and/or by an elastic seal.

The above applies accordingly to the lid. The locking device is then also such that the lid in the placed state is moved from an initial position to an end position by the locking. The sensor is triggered by the movement of the lid to the end position, in the end position, the lid is locked. The sensor is therefore triggered when the lid is in the end position.

In one embodiment, the locking device is such that the first part of the attachment part is moved from the initial position to the end position by the locking. The first part is such that it moves the second part of the attachment part from the initial position to the end position by the locking. The second part is such that it has triggered the sensor when the second part is in its end position.

The second part is therefore not moved directly into the end position, e.g. by the locking device in a motorized manner. Instead, this is done by the first part. If the first part were not present, then the second part could not be moved from an initial position to the end position during locking. Conversely, it is possible that the first part can be moved into the end position in a motorized manner, for example, and be locked by the locking device, without the second part being present.

In one embodiment, the second part is a container and the first part is a cover for the opening of the container. The cover can be placed on the container. The opening of the container is then at least partially closed. The container is such that it can be inserted into the food preparation vessel. The container preferably has a widening on its upper side, which can be placed on the opening edge of the food preparation vessel. The widening is thus always located outside the food preparation vessel. The widening is thus basically visible from the outside even when the remaining part of the container is inserted into the food preparation vessel. The widening is also basically visible from the outside if, in addition, the cover is placed on the container. The widening of the container can be circular or part-circular.

Preferably, the container comprises a holder for the cover such that the cover is secured by the holder against lateral slipping when the cover is placed on the container.

In one embodiment, the container has a laterally projecting edge on its upper side, at least in sections. The edge then projects laterally in a flange-like manner from the remaining part of the container and widens the container at its upper side. This widening of the container may comprise a recess for the cover. The cover may be inserted into the recess. The recess of the widening can thus protect the cover from slipping sideways. The recess thus serves as a holder or may be part of the holder. The flange-like projecting edge may surround the opening of the container completely or at least in sections.

In one embodiment, the sensor may be triggered by the flange-like and/or laterally projecting edge of the container. For example, the laterally projecting edge of the container may rest on a pushbutton or rocker arm of an electrical switch when the container has been inserted into the food preparation vessel. The container is then inserted into the food preparation vessel in such a way that at least a section of the laterally projecting edge located at the electrical switch can be pressed downwards against a spring force of the pushbutton. If the laterally projecting edge of the container is pressed downwards, the pushbutton or the rocker arm is moved and the electrical switch is thus triggered. The electrical switch is thus a sensor in the sense of the present disclosure. However, the movement of the laterally projecting edge or a section of the laterally projecting edge from an initial position to an end position can also be detected, for example, optically or, for example, by means of ultrasound.

In one embodiment, the container comprises on its upper side at least one upwardly and/or laterally projecting handle. If the handle projects laterally, the handle can be used as a widening that prevents the container from sliding completely into the food preparation vessel. If the handle projects upwards, it can protect the cover from lateral sliding and thus be at least part of the holder for the cover. If the handle projects both laterally and upwards, the handle can be used both as a widening and as a holder for the cover.

In one embodiment, the attachment part comprises a chopping tool for chopping food. The chopping tool is arranged, or may be arranged, relative to the container such that, after being chopped by the chopping tool, a food or an ingredient of a food falls down by gravity to be collected in the container of the attachment part. The chopping tool may be rotatable to chop a food or an ingredient of a food by rotating. For example, the chopping tool may be a rotatable friction disc. Such a friction disc may comprise upwardly projecting teeth. Further, the friction disc may comprise holes to allow ingredients of a food to be chopped by the teeth to pass through the friction disc and fall into the container.

In particular, the chopping tool has at least one cutting edge for chopping. The chopping tool may be a cutting disc. It may have elongated, substantially radially arranged blades for cutting slices, for example of potatoes. It may alternatively or additionally have localized recesses or indentations provided with a blade, for example for chopping vegetables. The function may be dependent on the direction of rotation of the cutting disc. For example, strips are cut in one direction of rotation of the cutting disc and slices in the opposite direction.

The chopping tool enables particularly controlled chopping of ingredients for a food, as foods or ingredients fall into the container after chopping and cannot be chopped any further.

The container may comprise a centrally and/or vertically extending opening through which a drive shaft of the food preparation appliance can pass in order to drive the chopping tool. The food preparation appliance may be configured such that in such a positioned state of the container a shaft runs through the food preparation vessel in order to drive the chopping tool by means of a motor located below the food preparation vessel. The shaft can be multi-part and comprise coupling elements to connect the different sections of the shaft to each other.

In an advantageous embodiment, a section of the shaft may connect a mixing tool of the food preparation appliance to the chopping tool in a rotationally fixed manner. Rotation of the mixing tool then results in the chopping tool being rotated at the same rotational speed. This section of the shaft can in particular be released from the mixing tool in order to be able to use the food preparation appliance with the mixing tool located therein independently of the chopping tool with the associated section of the shaft and the container. The chopping tool may be firmly connected to the section of the shaft. However, it is also possible that the chopping tool is detachably connected to said section of the shaft to facilitate storage and cleaning.

In one embodiment, the chopping tool is rotatably arranged in a housing part of the container. The chopping tool may be arranged or arrangeable in such a way that food introduced through an opening in the cover is collected in the container after passing through the chopping tool. The same applies here as elsewhere in the description for ingredients of a food. The opening has in particular the form of a neck. It can be closed by a plunger which is designed to press the food into it.

In one embodiment, the attachment part is located between two locking elements of the locking device when the attachment part is placed on the food preparation vessel. The same applies to the placed lid. The attachment part and the lid can thus be locked particularly reliably.

In one embodiment, a locking element of the locking device is an arm rotatable about its longitudinal axis which can be rotated from an open position to a locking position and back. The rotatable arm can preferably be rotated by an electric drive of the food preparation appliance. The arm may have a part-circular cross-section. Preferably, there are two such arms. The attachment part is then located between the two arms when the attachment part is placed on the food preparation vessel. The same applies to the lid.

The sensor may, for example, be an optical sensor, which can thus determine in an optical manner whether an attachment part or a lid is locked. The sensor may comprise a light barrier, for example. The light barrier is interrupted by the locking, for example. If the light barrier is interrupted, the sensor is in the triggered state. The sensor may be an inductive sensor, for example. An inductive signal can then be triggered by the locking. Subsequently, the sensor is in the triggered state. The sensor may be a pressure sensor. For example, pressure may be applied to the sensor by the locking. The sensor is then in the triggered state. In a preferred embodiment, the sensor is an electrical switch with a pushbutton or a rocker arm on which the attachment part rests when the attachment part is placed on the food preparation vessel.

The food preparation appliance may comprise a rotatable mixing tool for mixing and/or chopping a food in a bottom region of the food preparation vessel. By means of the mixing tool, one or more ingredients of a food can be mixed and/or chopped particularly quickly and easily. However, compared to the chopping tool, chopping can be performed with less control.

In order to be able to chop particularly quickly and easily, it has been proven that the mixing tool can be rotated at at least 2000 or 3000 revolutions per minute, preferably 5000 revolutions per minute. However, lower rotational speeds may also be sufficient to chop a food or an ingredient of a food quickly and easily. Particularly preferably, rotation can be performed at at least 8000 rpm. Low rotation speeds may be used to merely mix a food or ingredients of a food without chopping the food or ingredients of a food.

The lid for the food preparation vessel may be in two parts. A first lid part of a two-part lid may comprise a comparatively small opening that can be closed with the second part of the lid. The second part of the lid can be removed manually, in particular, and completely independently of a locked state. A small opening is then provided through which a food or ingredients of a food can be filled into the food preparation vessel even when the first part of the lid is firmly connected to the food preparation vessel by the locking device. The second part of the lid may comprise a vessel shape which can then serve, for example, as a measuring cup to be able to dose ingredients. The lid is completely closed, so that the food preparation vessel is then inaccessible from the outside. A lid in the sense of the present disclosure is at least predominantly closed.

The food preparation appliance preferably comprises a control unit with which the rotational speed for the mixing tool can be set. By means of the control unit, a rotational speed of at least 5000 revolutions per minute, preferably of at least 8000 revolutions per minute, can basically be set for the mixing tool. The mixing tool can therefore then rotate at at least 5000 revolutions per minute, preferably at least 8000 revolutions per minute. Particularly preferably, 10,000 revolutions per minute and more are possible. The above-mentioned rotational speeds ensure that ingredients of a food, which are located directly in the food preparation vessel, can be chopped quickly and reliably. Such high rotational speeds are not absolutely necessary for chopping the ingredients of a food. However, such high rotational speeds facilitate the desired chopping. The control unit therefore does not necessarily have to be able to set a rotational speed of at least 5000 revolutions per minute or at least 8000 revolutions per minute.

The food preparation appliance, namely a base part of the food preparation appliance, may comprise an input device such as a slider, a rotary knob and/or a touch-sensitive display. Via the input device, a desired rotational speed can be manually set. By means of the input device, it can be set, for example, that the mixing tool rotates at 5000 revolutions per minute. Following a corresponding input, the control unit then controls the rotational speed so that the mixing tool rotates at 5000 revolutions per minute. Other rotational speeds can also be selected by the input device, for example less than 5000 revolutions per minute or more. The input device may be such that rotational speeds can be changed continuously. The input device may be designed such that different steps and thus different rotational speeds can be set. The input device may be designed such that at least five different steps for rotational speeds are available.

The control unit may be designed such that the rotational speed for the mixing tool is limited to below 25000 revolutions per minute in order to avoid mechanical overloads.

The control unit may be designed such that it can set a rotational speed for the mixing tool in an automated manner, for example depending on a digitally stored recipe or depending on one or more measured values determined by means of one or more sensors. The one or more sensors may be part of the food preparation appliance, for example part of the base part and/or the food preparation vessel. However, it may also be an external sensor, such as a thermometer, which can exchange data wirelessly with the food preparation appliance, in particular with the base part.

A mixing tool may comprise at least one blade projecting from a shaft. The blade comprises at least one cutting edge through which ingredients of a food can be chopped particularly well. The cross-section of a cutting edge tapers to a point. On a side opposite the cutting edge, the blade may have a blunt edge. Compared to the cutting edge, ingredients of a food cannot be chopped with the blunt edge, or at least the chopping is significantly worse. In particular in this embodiment of the present disclosure, the direction of rotation of the mixing tool can be selected to optionally chop or only mix.

The mixing tool may comprise a plurality of such blades. For example, there may be two, three, or four blades, which may protrude from the shaft, for example radially in an evenly distributed manner. In the axial direction, blades may be arranged at different heights, at least in sections, to be able to grasp food or ingredients of a food in the food preparation vessel at different heights. Basically, all blades are arranged close to the base of the food preparation vessel. The blades are therefore located, for example, only in the lower third of the food preparation vessel. The one or more blades of the mixing tool are thus preferably arranged near the bottom of the food preparation vessel to be able to grasp ingredients of a food close to the bottom.

The shaft of the mixing tool can be driven by an electric motor of the food preparation appliance. The control unit can then control the rotational speed of the electric motor and thus the rotational speed of the mixing tool. Preferably, the control unit can also control the direction of rotation of the mixing tool.

The shaft of the mixing tool may pass through the bottom of the food preparation vessel so that the shaft does not obstruct the filling of a food into the food preparation vessel. The shaft of the mixing tool can also extend into the food preparation vessel from above.

The mixing tool may be firmly connected to the food preparation vessel. This does not exclude that the mixing tool can be disassembled from the bottom of the food preparation vessel also without a tool, in particular in order to be able to clean the mixing tool easily and thoroughly from all sides.

The food preparation vessel is liquid-tight. A liquid can therefore be filled into the food preparation vessel without the liquid flowing out of the food preparation vessel.

The shaft of the mixing tool may comprise a coupling element below the bottom of the food preparation vessel, which can be coupled to a coupling element of a shaft of an electric motor. In the coupled state, a rotary movement of the electric motor can then be transmitted to the mixing tool. By providing such coupling elements, it can be achieved that the food preparation vessel can be released from the remaining part of the food preparation appliance. The two coupling elements thus connect the two shafts to each other in a rotationally fixed manner, basically in both directions of rotation. It is not necessary that the two coupling elements connect the two shafts in axial direction. To the contrary, this is even disadvantageous, because removal of the food preparation vessel is then impeded.

If an ingredient of a food is in a container of the attachment part, then the ingredient is not directly in the food preparation vessel. An ingredient that is in the container cannot be mixed or chopped by the mixing tool.

A container of the attachment part may be liquid-tight like the food preparation vessel. However, a container may be screen-shaped, for example. The function of the container may be to prevent chopped ingredients of a food from being further chopped by the mixing tool. This can be achieved by screen-shaped walls of the container. Therefore, the walls and/or the bottom of the container do not necessarily have to be liquid-tight. However, a liquid-tight container is particularly preferable, as it reliably prevents chopped food or ingredients that have been chopped from unintentionally entering the food preparation vessel.

The present disclosure further relates to an attachment part for insertion into a food preparation vessel of a food preparation appliance according to the present disclosure, which comprises a container and a cover for the container, wherein at least one step is inserted into an opening of a handle of the container when the cover covers the container, and the container comprises a laterally projecting upper edge.

The attachment part may comprise a chopping tool.

The present disclosure further relates to a method for chopping a food using a food preparation appliance according to the present disclosure, wherein the attachment part is placed on the food preparation vessel of the food preparation appliance and is locked after being placed thereon, wherein the sensor is triggered by a part of the attachment part by the locking.

The invention claimed is:

1. A food preparation appliance comprising:
a food preparation vessel;
a lid which can be placed on the food preparation vessel;
an attachment part which can be placed on the food preparation vessel instead of the lid, the attachment part comprising a first part and a second part;
a base part for receiving the food preparation vessel, the base part comprising a locking device for locking the lid placed on the food preparation vessel and for locking the attachment part placed on the food preparation vessel, wherein, in a locked state, the lid or the attachment part which has been locked to the food preparation vessel cannot be removed from the food preparation vessel; and a sensor which is triggered when the placed lid is locked by the locking device or when the placed attachment part is locked by the locking device, wherein the sensor is not triggered when only one part of the attachment part is placed on the food preparation vessel and locked, and wherein the sensor includes an electrical switch with a rocker arm on which the attachment part rests when the attachment part is placed on the food preparation vessel.

2. The food preparation appliance of claim 1, wherein the locking device is such that the attachment part in the placed state is moved by the locking from an initial position to an end position, and the sensor is triggered when the attachment part is in the end position.

3. The food preparation appliance of claim 2, wherein the locking device is such that the first part of the attachment part is moved from the initial position to the end position by the locking, and the first part is such that it moves the second part of the attachment part from the initial position to the end position by the locking, and the second part is such that it has triggered the sensor when the second part is in its end position.

4. The food preparation appliance of claim 3, wherein the second part is a container and the first part is a cover for the container.

5. The food preparation appliance of claim 4, wherein the container has on its upper side, at least in sections, a laterally projecting edge.

6. The food preparation appliance of claim 5, wherein the sensor is triggered by the projecting edge of the container.

7. The food preparation appliance of claim 4, wherein the container comprises on its upper side at least one upwardly and/or laterally projecting handle.

8. The food preparation appliance of claim 4, wherein the attachment part includes a rotatable chopping tool for chopping foods, and wherein the chopping tool is arranged or arrangeable relative to the container such that a food, after being chopped by means of the chopping tool, falls down by gravity to be collected in the container of the attachment part.

9. The food preparation appliance of claim 1, wherein the attachment part is located between two locking elements of the locking device when the attachment part is placed on the food preparation vessel.

10. The food preparation appliance of claim 1, wherein a locking element of the locking device is an arm rotatable about its longitudinal axis, wherein the arm can be rotated from an open position to a locking position and back, and wherein the rotatable arm is rotated by an electric drive of the food preparation appliance.

11. The food preparation appliance of claim 1, further comprising a rotatable mixing tool for mixing and/or chopping a food in a bottom region of the food preparation vessel, a control unit configured to set the rotational speed for the mixing tool, wherein the control unit is configured to set the rotational speed of the mixing tool at one of at least 2000 revolutions per minute, at least 5000 revolutions per minute, and at least 8000 revolutions per minute.

12. The food preparation appliance of claim 1, wherein the attachment part comprises a container and a cover for the container, wherein the cover is configured to be inserted into an opening of a handle of the container when the cover covers the container, and wherein the container comprises a laterally projecting upper edge.

13. The food preparation appliance of claim 1, wherein the attachment part is a chopping tool.

14. A method for chopping a food using a food preparation appliance, wherein the food preparation appliance includes:

a food preparation vessel, a lid which can be placed on the food preparation vessel, an attachment part which can be placed on the food preparation vessel instead of the lid, the attachment part comprising a first part and a second part, a base part for receiving the food preparation vessel, the base part comprising a locking device for locking the lid placed on the food preparation vessel and for locking the attachment part placed on the food preparation vessel, wherein, in a locked state, the lid or the attachment part cannot be removed from the food preparation vessel, a sensor including an electrical switch with a rocker arm on which the attachment part rests when the attachment part is placed on the food preparation vessel, the method comprising:

placing the lid or the attachment part on the food preparation vessel of the food preparation appliance;

locking, after placing, the lid or the attachment part to the food preparation vessel;

triggering the sensor when the lid is locked to the food preparation vessel;

not triggering the sensor when only one of the parts of the attachment part is locked to the food preparation vessel;

triggering the sensor when both the first part and the second part of the attachment part are locked to the food preparation vessel; and chopping a food using the locked attachment part after the sensor has been triggered.

15. A food preparation appliance comprising:

a food preparation vessel;

a lid which can be placed on the food preparation vessel;

an attachment part placeable on the food preparation vessel instead of the lid, the attachment part including a first part and a second part and configured to chop or blend a food in the food preparation vessel;

a base part for receiving the food preparation vessel, the base part comprising a locking device for locking the lid placed on the food preparation vessel and for locking the attachment part placed on the food preparation vessel, wherein, in a locked state, the lid or the attachment part which has been locked to the food preparation vessel cannot be removed from the food preparation vessel; and a sensor configured to permit activating the attachment part, in response to both the first part and the second part of the attachment part being placed on the food preparation vessel and locked, and prevent activating the attachment part, in response to only one of the first part and the second part of the attachment part being placed on the food preparation vessel and locked, wherein the sensor includes an electrical switch with a rocker arm on which the attachment part rests when the attachment part is placed on the food preparation vessel.

* * * * *